United States Patent [19]

Matsuoka

[11] Patent Number: 5,542,200
[45] Date of Patent: Aug. 6, 1996

[54] NUMBER PLATE INCLUDING LUMINOUS CHARACTERS

[75] Inventor: Masaaki Matsuoka, Tokyo, Japan

[73] Assignee: World Auto Plate, Ltd., Tokyo, Japan

[21] Appl. No.: 268,334

[22] Filed: Jun. 30, 1994

[30] Foreign Application Priority Data

Aug. 23, 1993 [JP] Japan .................................. 5-050130

[51] Int. Cl.$^6$ .................................................. G09F 13/02
[52] U.S. Cl. .............................. 40/204; 40/206; 40/544; 362/83.2
[58] Field of Search .......................... 40/204, 206, 209, 40/544, 580, 591; 362/83.2, 84, 812

[56] References Cited

U.S. PATENT DOCUMENTS

| | | | |
|---|---|---|---|
| 1,417,400 | 5/1922 | McGarvin | 40/206 |
| 3,161,974 | 12/1964 | Blockson | 40/544 |
| 3,404,474 | 10/1968 | Johnson | 40/544 |
| 3,521,391 | 7/1970 | Murai | 40/591 X |
| 3,680,237 | 8/1972 | Finnerty, Sr. | 40/544 |
| 4,457,089 | 7/1984 | Phillips, Jr. | 40/544 |
| 4,791,746 | 12/1988 | Coronato | 40/580 X |
| 4,864,473 | 9/1989 | Tokarz et al. | 362/84 |

FOREIGN PATENT DOCUMENTS

| | | | |
|---|---|---|---|
| 387286 | 2/1933 | United Kingdom | 40/209 |
| 781339 | 8/1957 | United Kingdom | 40/209 |
| 2230638 | 10/1990 | United Kingdom | 40/544 |

*Primary Examiner*—Joanne Silbermann
*Attorney, Agent, or Firm*—Koda and Androlia

[57] ABSTRACT

A number plate including luminous characters is usually mounted below head lamps of a vehicle. As essential components, this number plate includes a front plate having a plurality of character portions punched therefrom a plurality of characters each molded of a transparent or translucent synthetic resin and adhesively fitted into the character portions, a plurality of electroluminescent plates disposed on the rear surface side of the front plate so as to illuminate the character portions, a DC/AC inverter disposed on the bottom side of a case of the number plate and electrically connected to the electroluminescent plate and a power source, a plurality of base boards each fitted to an electroluminescent plate and having the substantially same area as that of each character portion, and a support portion for supporting the base boards thereon. When the base boards are fitted to the support portion, the latter serves as two electrodes for the electroluminescent plates, whereby the support portion is electrically connected to the electroluminescent plates via the foregoing two electrodes.

7 Claims, 4 Drawing Sheets

NUMBER PLATE INCLUDING LUMINOUS CHARACTERS

BACKGROUND OF THE INVENTION

1. Field of the Invention

The present invention relates generally to a vehicular number plate including luminous characters, numerals or similar marks. More particularly, the present invention relates to a number plate of the foregoing type which assures that character portions on the number plate are illuminated uniformly more than those of a conventional number plate, the number plate has excellent durability, and moreover, it can easily and simply be fabricated.

2. Description of the Related Art

A hitherto known number plate including luminous characters, numerals or similar marks (hereinafter referred to simply as a luminous number plate) is typically constructed as shown in FIG. 5 and FIG. 6. Specifically, the luminous number plate includes a flat case 1 to which an openable frame 2 is turnably fitted. A front plate 4 coated with a paint having a specified color is attached to the frame 2 to serve as a so-called number plate by tightening set screws. The front plate 4 has a plurality of character portions 3 punched therefrom to which character-like plates 31 each molded of a transparent synthetic resin are adhesively secured. To illuminate the character portions 3 at night, two bulbs 5 are disposed inside of the flat case 1.

With the conventional luminous number plate as constructed in the above-described manner, when the character portions 3 are illuminated by the bulbs 5, they can visually be recognized from remote locations. However, it has been found that the conventional luminous number plate has a drawback that the respective character portions 3 are illuminated in a different manner such that the character portions 3 located directly above the illuminating bulbs 5 are brightly illuminated but the character portions 3 located remote from the illuminating bulbs 5 are illuminated with reduced brightness.

In view of the foregoing drawback, at present, a translucent milk-white light scattering plate 7 (see FIG. 7) having black paints 6 coated and baked in the region corresponding to the illuminating bulbs 5 while having a thickness gradually reduced toward the peripheral part thereof is interposed between the front plate 4 and the bulbs 5 so as to allow a quantity of light beam measured directly above the bulbs 5 or in the vicinity of the same to be reduced in order to assure that the character portions 3 are uniformly illuminated (refer to an official gazette of Japanese Utility Model publication No. 16,308/1978).

However, when the black paints 6 are peeled away from the scattering plate 7 or one of the bulbs 5 is turned off for some reason, there arises another drawback that all characters 31 on the character portions 3 are irregularly illuminated, and moreover, they are hardly visually recognized by anybody.

To obviate the foregoing drawback, a luminous number plate having phenomenon of electroluminescence employed as a light source has been developed. Specifically, this luminous number plate is constructed such that character portions are punched from a front plate, character-like plates each molded of a transparent or translucent synthetic resin are adhesively fitted into the character portions, a single electroluminescent plate is disposed behind the character portions so as to allow the latter to be illuminated with the electroluminescent plate, a DC/AC inverter electrically connected to a power source for a vehicle is attached to the rear surface of the electroluminescent plate, and two electrodes each extending across the substantially whole length of the electroluminescent plate are electrically connected to the DC/AC inverter at the opposite of the luminous number plate as viewed in the longitudinal direction.

With the luminous number plate having the electroluminescent plate arranged in that way, however, since the electroluminescent plate is arranged on the whole surface of the luminous number plate in the longitudinal direction, another drawback is that the luminous number plate is fabricated at an expensive cost. In addition, since the whole electroluminescent plate should be replaced with a new one when the luminous number plate is replaced with another one for some reason, an additional drawback is that the luminous number plate is fabricated at an unacceptable economical efficiency. Additionally, since the electroluminescence plate is designed with large dimensions, it is anticipated that there arises another drawback that a load to be borne by the luminous number plate in association with an electric current applied thereto is hardly uniform, resulting in the respective character portions being hardly uniformly illuminated by the electroluminescent plate.

SUMMARY OF THE INVENTION

The present invention has been made in consideration of the aforementioned drawbacks.

An object of the present invention is to provide a number plate including luminous characters wherein the number plate assures that it is impossible to falsely replace or exchange a plurality of characters on the number plate with another ones.

A secondary object of the present invention is to provide a number plate including luminous characters with electroluminescent plates each used to serve as a light source wherein the number plate assures that a quantity of practical usage of electroluminescent plates can be reduced, and attachment of the respective electroluminescent plates and replacement of the same with another ones are easily achived.

The present invention provides a number plate including luminous characters, wherein the number plate comprises a front plate having a plurality of character portions punched therefrom to serve as a so-called number plate, a plurality of characters each molded of a transparent or translucent synthetic resin, the characters being adhesively fitted into the character portions, a plurality of electroluminescent plates disposed on the rear surface side of the front plate so as to illuminate the character portions with a light beam generated thereby, a DC/AC inverter disposed on the bottom side of a case of the number plate, the DC/AC inverter being electrically connected to the electroluminescent plates and a power source for a vehicle via two electrodes, a plurality of base boards each secured to an electroluminescent plate and having the substantially same area as that of each character portion, and a support portion for supporting the base boards by fitting the latter thereto, the support portion serving as two electrodes for the electroluminescent plates and electrically connected to the latter.

According to the present invention, the number plate is constructed such that a plurality of electroluminescent plates are used to serve as illuminating portions, a plurality of base boards each secured to an electroluminescent plate and having the substantially same area as that of each character portion are fitted to a support portion having two electrodes formed thereon, and the electroluminescent plates are electrically connected to the support portion via the foregoing two electrodes. With this construction, a quantity of practical usage of the electroluminescent plates can be reduced. When there arises a necessity for replacing the electroluminescent plates with other ones for some reason, replacement can easily and simply be achieved without any particular necessity for a highly trained skill. Since an assembling operation is achieved for the number plate merely by fitting the base boards to a frame, it can be performed at a high efficiency. In addition, since each electroluminescent plate is practically used for a long time of about 5000 hours, durability of the number plate can largely be improved compared with the conventional number plate including two bulbs. Additionally, since no light scattering plate is used for the number plate, there does not arise a necessity for adhesively securing a seal material to a light scattering plate or coating a paint and baking the latter deposited on the light scattering plate. Further, there does not arise a malfunction that the paint or the seal material is peeled away from the light scattering plate under thermal influence.

Other objects, features and advantages of the present invention will become apparent from reading of the following description which has been made in conjunction with the accompanying drawings.

BRIEF DESCRIPTION OF THE DRAWINGS

The present invention is illustrated in the following drawings in which.

DESCRIPTION OF THE PREFERRED EMBODIMENT

The present invention will now be described in detail hereinafter with reference to the accompanying drawings which illustrate a preferred embodiment thereof.

Figure 1:
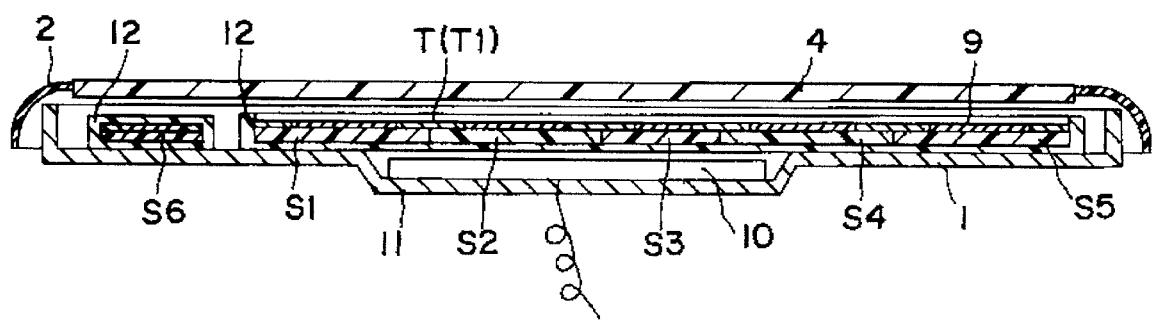
FIG. 1 is a sectional view of a number plate including luminous characters wherein the number plate is constructed according to an embodiment of the present invention.
Figure 3:
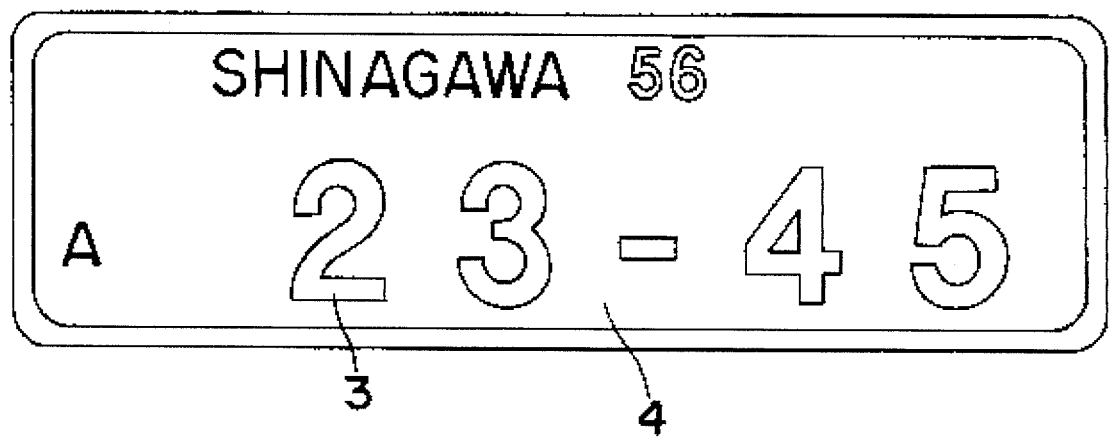
FIG. 3 is a front view of the number plate shown in FIG. 1 wherein an openable frame is turnably removed therefrom.

As shown in FIG. 1, in this embodiment, a number plate including luminous characters (hereinafter referred to simply as a number plate) is constructed such that a plurality of character portions 3 (see FIG. 3) are punched from a front plate 4 to serve as a so-called number plate, characters, numerals or similar marks each molded of a transparent synthetic resin are adhesively fitted into the character portions 3, an openable frame 2 is turnably secured to the front plate 4 sttached to the whole surface of a case 1 of the number plate, and a plurality of electroluminescent plates 9 (hereinafter referred to as EL plates) are disposed in the interior of the case 1 on the bottom side of the latter corresponding to the character portions 3 so as to allow the character portions 3 to be illuminated by the EL plates 9.

A box-like portion 11 is formed on the bottom side of the case 1 so as to allow a DC/AC inverter 10 to be accommodated therein. The DC/AC inverter 10 is electrically connected to a power source 10A for a vehicle, whereby the direct electric current fed from the power source is converted into an alternate electric current by the DC/AC inverter 10.

Figure 2:
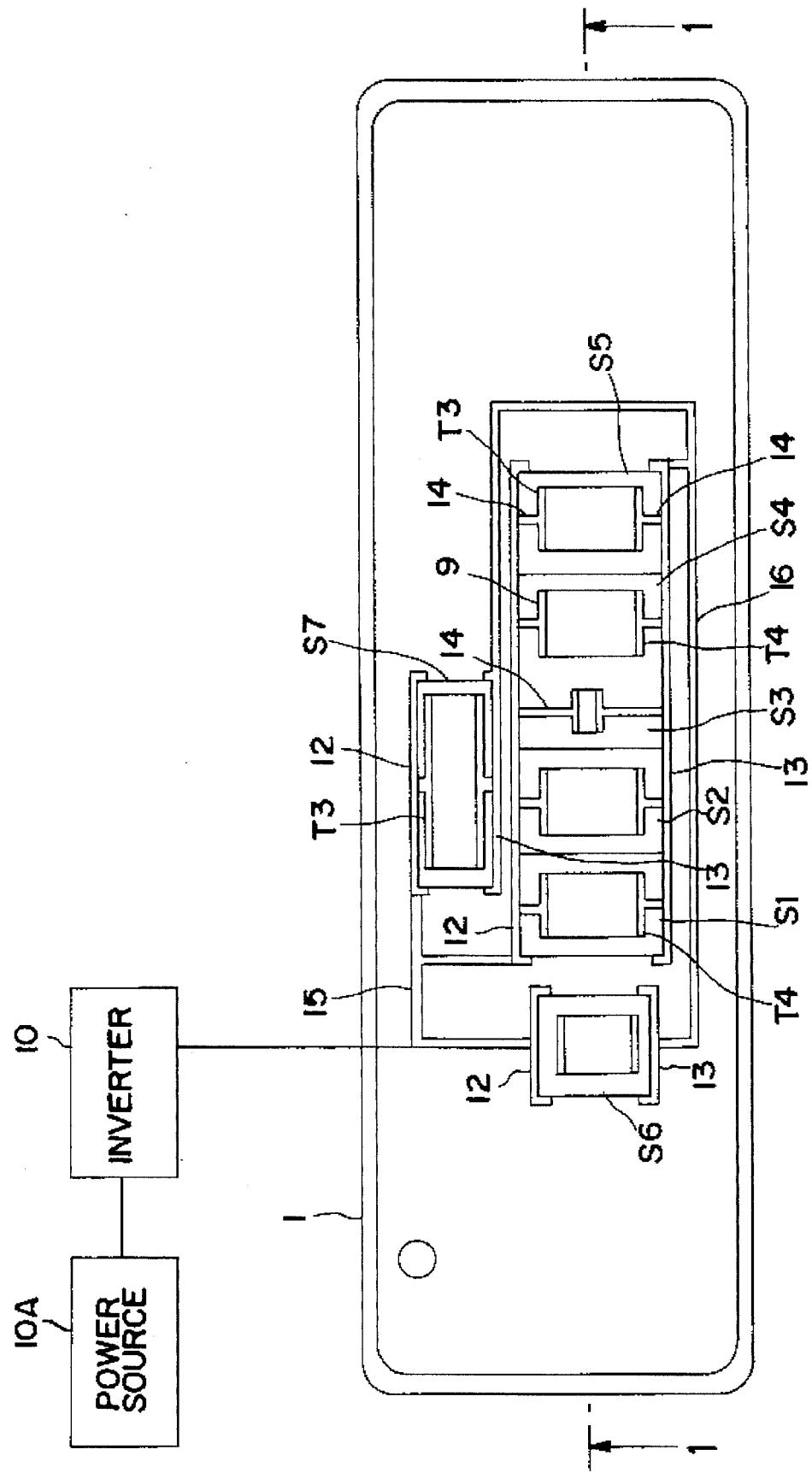
FIG. 2 is a front view of the number plate shown in FIG. 1 wherein a front plate is removed therefrom.

Each EL plate 9 is attached to a base board S made of, e.g., a synthetic resin, a metallic material or the like with the substantially same area as that of each character portion 3 (represented by dimensions of about 4×8 cm because an area represented by dimensions of 4×8 cm is given to ordinary numeral characters 2, 3, 4 and 5 located at the central part of the number plate in conformity with regulations prescribed in this country). As is best seen in FIG. 2, in this embodiment, the base boards S each having an EL plate 9 attached thereto are arranged in the case 1 to visually indicate characters, numerals and marks. Specifically, five base boards S1, S2, S3, S4 and S5 are assingned to numerals and a mark "-" located at the central part of the case 1, and an independent base board S6 located at the left-hand side of the case 1 is assigned to a Japanese character. In this country, the base board S6 assigned to the foregoing Japanese character is designed to have dimensions smaller than those for the base boards S1 to S5.

In addition, the number plate includes a transversely extending elongated rectangular base board S7 located at the upper part of the case 1 in order to visually indicate a registered local area name and the kind of vehicle, and a series of characters on the base board S7 are illuminated by an EL plate 9 attached to the base board S7.

It is obvious that a size of each base board S varies from country to country.

Figure 4:
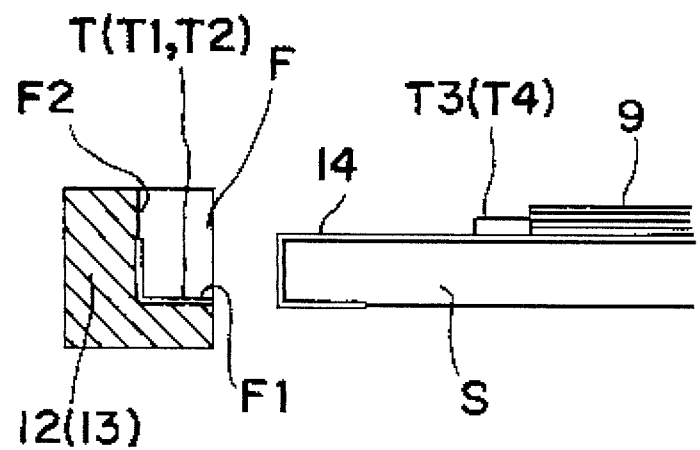
FIG. 4 is a fragmentary enlarged sectional view of the number plate, particularly showing how a frame is connected to a base board.
Figure 5:
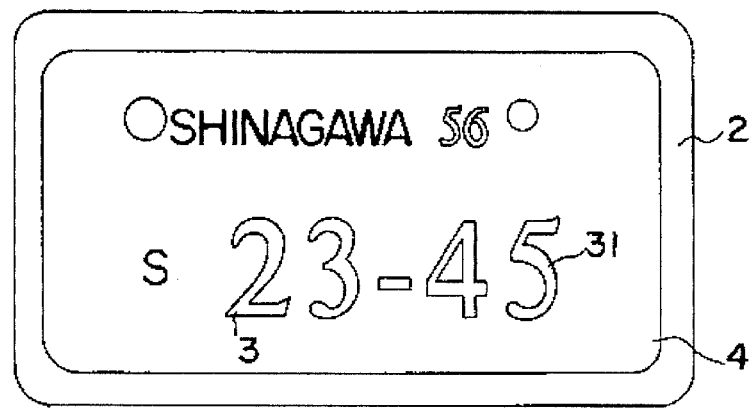
FIG. 5 is a front view of a conventional number plate including luminous characters.
Figure 6:
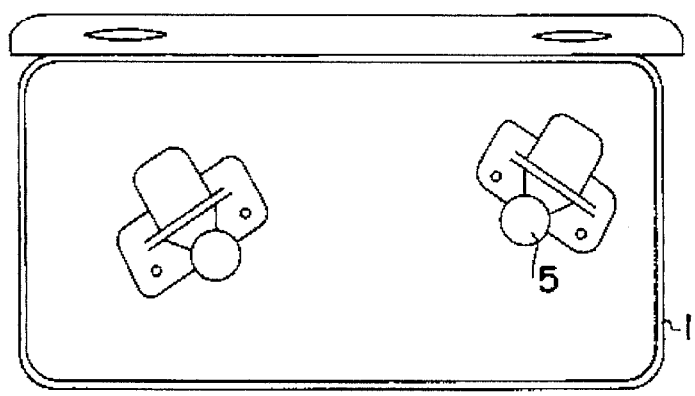
FIG. 6 is a front view of the conventional number plate, particularly showing the internal structure of the number plate while an openable is kept turnably opened.
Figure 7:
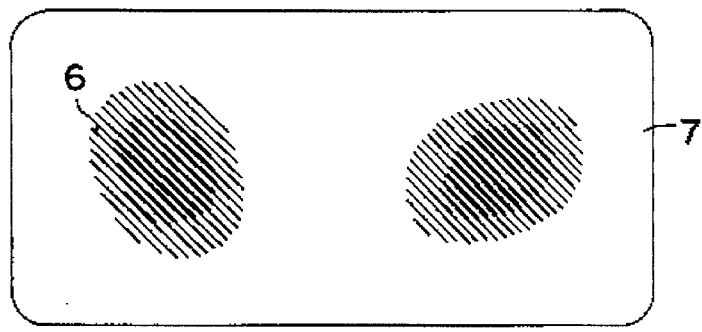
FIG. 7 is a front view of the conventional number plate, particularly showing the structure of a light scattering plate constituting the number plate.

A plurality of base boards S each having an EL plate 9 attached thereto are supported by support portions defined by frames 12 and 13 for supporting the respective base boards S thereon. As shown in FIG. 2, the frames 12 and 13 are disposed at the upper and lower parts of the case 1 while extending in parallel with each other. Each of the frames 12 and 13 is designed to exhibit a hook-shaped sectional contour while forming a stepped part F as shown in FIG. 4. Electrode terminals T are formed on a horizontal plane F1 and a vertical plane F2 of the stepped part F by employing an electric plating process, a thermal transferring process or the like. With respect to the electrode terminals T for the frames 12 and 13, an electrode for the horizontal plane F1 is designated by reference character T1 and an electrode for the vertical plane F2 is designated by reference characters T2.

Each base boards S includes a pair of electrical conductive portions 14 which are electrically connected to electrode terminal T3 and T4 of each EL plate 9. Each electrical conductive portion 14 extends from one of the opposite end surfaces of each base board S to one of the opposite side surfaces of the frame 12 or 13. Thus, when the base board S is fitted to the stepped part F of each of the frames 12 and 13, the electrical conductive portions 14 are electrically connected to the electrodes T1 and T2 (see FIG. 4).

With such construction, when the respective base boards S are fitted to the frames 12 and 13, they are electrically connected to each other in parallel with each other. The electrode T1 and the electrode T2 of the frames 12 and 13 are electrically connected to a power source (not shown) via electrical conductive portions 15 and 16 the DC/AC converter 10.

Since the number plate is constructed in the above-described manner, when it is loaded with a direct electric current from the power 10A on the vehicle, the DC/AC converter 10 converts DC into AC. Then, AC is inputted into the respective EL plates 9 via the electrical conductive portion 15, the electrode T1 of the frame 12, the electrical conductive portion 14 of each base board S and the electrode terminal T3 each EL plate 9, and thereafter, flows further via the electrode T4, the elecrical conductive portion 14, the electrode T2 and the electrical conductive portion 16, resulting in the respective EL plates 9 being illuminated with AC.

In general, each EL plate 9 has a running life of about 5000 hours. For this reason, it is recommendable that each EL plate is replaced with a new one at the time of legally specified regular vehicle inspection. In practice, there often arises an occasion that the vehicle is exposed to severe running conditions. In addition, there is a possibility that some or all of the EL plates 9 are damaged, broken or hardly illuminated due to moisture, vibration, temperature or similar factors. Once such a malfunction as mentioned above occurs, the EL plates should be replaced with new ones. In this embodiment, replacement can be achived merely by removing the base boards S1 to S7 each having an EL plate 9 attached thereto from the frames 12 and 13 and then fitting new base boards S1 to S7 each having a new EL plate attached thereto to the frames 12 and 13. Thus, e.g., also in a gasoline stand including no special tool or device, the used or damaged base boards S1 to S7 can easily and simply be replaced with new ones.

A plurality of characters on the number plate having EL plates attached thereto in that way are distributively illuminated with a degree of uniformity of 1.18 (represented by maximum brightness/minimum brightness) which is largely improved compared with a degree of brightness of 7.7 of the conventional number plate. In addition, the respective characters are variably illuminated with a variation coefficient of 0.53 (represented by brightness at 13 V-brightness at 9 V/brightness at 12 V) within the voltage variation range from 9 to 13 V which is substantially improved compared with a variation coefficient of 1.16 of the conventional number plate.

Additionally, all the EL plates of the number plate consume electricity of 3.2 W which is improved compared with 20 W of the conventional number plate (including two bulbs each consuming electricity of 10 W).

In the aforementioned embodiment, the base boards S1 to S5 are arranged separately from each other but it is not necessarily required that they are arranged in the foregoing separated state. It is obvious that a single base board may be substitured for a plurality of base boards S1 to S5. In this case, the number plate has a disadvantage that when there arises a necessity for exchanging an EL plate 9 for one of the base boards S1 to S5 with a new one for some reason, the remaining EL plates are unavoidably replaced with another ones. On the other hand, it has an advantage thet the number of components constituting the number plate can be reduced.

As described above, according to the present invention, the number plate is constructed such that a plurality of EL plates are used as illuminating portions, a plurality of base boards each having an EL plate attached thereto with the substantially same as that of each character portion are fitted into a support portion serving also as two electrodes, and the respective EL plates are electrically connected to the electrodes of the support portion. With this construction, a quantity of practical usage of EL plates can be reduced, and moreover, the used or damaged EL plates can easily and simply be replaced with new ones without any necessity for highly trained skill. In addition, an assembling operation can be performed with components constituting the number plate merely by fitting a plurality of base boards to the corresponding frame, resulting in the assembling operation being achieved at a high efficiency. Since each EL plate has a long running life of about 5000 hours, durability of the number plate of the present invention can largely be improved compared with the conventional number plate including two bulbs. In contrast with the conventional number plate, since no light scattering plate is used for the number plate of the present invention, any operation for adhesively securing a certain seal material to the light scattering plate or coating the latter with a certain paint having a specified color is not required at all. Additionally, there does not arise a malfunction that the paint or the seal material is peeled away from the light scattering plate.

While the present invention has been described above with respect to a single preferred embodiment thereof, it should of course be understood that the present invention should not be limited only to this embodiment but various change or modification may be made without departure from the scope of the present invention as defined by the appended claims.

What is claimed is:

1. A number plate including luminous characters, comprising:

a front plate having a plurality of character portions punched therefrom to serve as a number-plate, a plurality of characters each molded of a transparent or translucent synthetic resin, said characters being fitted into said character portions, a plurality of separate electroluminescent plates disposed on the rear surface side of said front plate in a number corresponding to a number of said plurality of characters, said plurality of electroluminescent plates for illuminating said character portions with a light generated thereby, a DC/AC inverter disposed on the bottom side of a case of said number plate, said DC/AC inverter being electrically connected to said electroluminescent plates and a power source for a vehicle via two electrodes, a plurality of base boards each secured to an electroluminescent plate and having the substantially same area as that of each character portion, and a support portion for supporting said base boards by fitting the latter thereto, said support portion serving as two electrodes for said electroluminescent plate and electrically connected to the latter.

2. The number plate as claimed in claim 1, wherein each of said base boards includes electrical conductive portions which are electrically connected to electrode terminals electrically connected to said electroluminescent plates and said electrodes formed on said support portion.

3. The number plate as claimed in claim 1 or claim 2, wherein said base boards are arranged separately from each other such that each of said base boards can be replaced with an additional base board.

4. The number plate as claimed in claim 3 wherein said support portion is disposed in parallel with the longitudinal direction of said number plate, and a stepped part having a hook-shaped sectional contour is formed on said support portion so as to allow each of said base boards to be fitted into said stepped part.

5. The number plate as claimed in claim 4, wherein said electrodes are formed on a horizontal plane, a vertical plane defining said stepped part of said support portion, and each electrical conductive portion extends from one of the opposite end surfaces of each of said base boards to one of the opposite side surfaces of said support portion, and said electrodes and said electrical conductive portions are electrically connected to each other by fitting each of said base boards to said support portion.

6. The number plate as claimed in claim 1 or claim 2, wherein said support portion is disposed in parallel with the longitudinal direction of said number plate, and a stepped part having a hook-shaped sectional contour is formed on said support portion so as to allow each of said base boards to be fitted into said stepped part.

7. The number plate as claimed in claim 6, wherein said electrodes are formed on a horizontal plane a vertical plane defining said stepped part of said support portion, and each electrical conductive portion extends from one of the opposite end surfaces of each of said base boards to one of the opposite side surfaces of said support portion, and said electrodes and said electrical conductive portions are electrically connected to each other by fitting each of said base boards to said support portion.

* * * * *